United States Patent [19]

Islam

[11] Patent Number: 5,530,948
[45] Date of Patent: Jun. 25, 1996

[54] SYSTEM AND METHOD FOR COMMAND QUEUING ON RAID LEVELS 4 AND 5 PARITY DRIVES

[75] Inventor: S. M. Rezaul Islam, Boca Raton, Fla.

[73] Assignee: International Business Machines Corporation, Armonk, N.Y.

[21] Appl. No.: 175,710

[22] Filed: Dec. 30, 1993

[51] Int. Cl.⁶ .................................................. G06F 11/34
[52] U.S. Cl. ................................... 395/182.04; 371/51.1; 395/441
[58] Field of Search ........................... 371/10.1, 8.1, 371/31, 40.1, 40.4, 67.1, 48, 51.1; 395/425, 575, 427, 438, 439, 440, 441, 182.04, 182.03, 181; 365/189.01, 200

[56] References Cited

U.S. PATENT DOCUMENTS

| | | | |
|---|---|---|---|
| 4,157,586 | 6/1979 | Gannon et al. | 364/200 |
| 5,191,584 | 3/1993 | Anderson | 371/51.1 |
| 5,195,100 | 3/1993 | Katz et al. | 371/10.1 |
| 5,208,813 | 5/1993 | Stallmo | 371/10.1 |
| 5,263,145 | 11/1993 | Brady et al. | 395/575 |
| 5,309,451 | 5/1994 | Noya et al. | 371/10.1 |
| 5,341,381 | 8/1994 | Fuller | 371/10.1 |
| 5,353,424 | 10/1994 | Partoui et al. | 395/425 |
| 5,373,512 | 12/1994 | Brady | 371/40.1 |

*Primary Examiner*—Robert W. Beausoliel, Jr.
*Assistant Examiner*—Albert Décady
*Attorney, Agent, or Firm*—Robert S. Babayi; Andrew J. Dillon

[57] ABSTRACT

The queuing of commands on an input/output controller for a parity drive, in a level 4 or level 5 redundant array of inexpensive disk drives responds to receipt of a write instruction with appended data by determining a logical block address of a data drive for the appended data and a logical block address of a parity drive for redundant data belonging to a destination stripe of the appended data. If a parity cache entry corresponds to the parity address, a cache hit has occurred. Responsive to a cache hit, computation of replacement parity data for the stripe may be done from parity data in cache at a location given by the parity cache entry, data read from the data drive and the appended data. The newly calculated parity data is then placed in cache. A command is then sent to an input/output controller for the drive where the parity data is located to write the replacement parity data. Serialization of access to the parity data is moved from the disk drive to cache memory, allowing command queuing to be used with the disk drive to preserve optimum available performance of the drive.

10 Claims, 5 Drawing Sheets

| ADDRESS RANGE | TIME STAMP | NWM | L/F | LOCATION |
|---|---|---|---|---|
| • | • | • | | • |
| • | • | • | | • |
| • | • | • | | • |
| • | • | • | | • |
| • | • | • | | • |
| • • | • • | • • | | • • • |

Fig. 6

SYSTEM AND METHOD FOR COMMAND QUEUING ON RAID LEVELS 4 AND 5 PARITY DRIVES

BACKGROUND OF THE INVENTION

1. Technical Field:

The present invention relates to sets of mass storage devices that collectively perform as one or more logical mass storage devices. In particular, the invention relates to a system and method of command queuing on parity drives in RAID levels 4 and 5 systems.

2. Description of the Related Art:

Use of disk memory continues to be important in computers because it is nonvolatile and because memory size demands continue to outpace practical amounts of main memory. At this time, disks are slower than main memory so that system performance is often limited by disk access speed. Therefore, it is important for overall system performance to increase memory size and data access speed of disk drive units. For a discussion of this, see Michelle Y. Kim, "Synchronized Disk Interleaving", *IEEE Transactions On Computers,* Vol. C-35, No. 11, November 1986.

Disk memory size can be increased by increasing the number of disks and/or increasing the diameters of the disks, but this does not increase data access speed. Memory size and data transfer rate can both be increased by increasing the density of data storage. The data transfer rate can be increased by increasing disk rotational speed. However, technological constraints limit data density and high density and high speed disks are more prone to errors.

A variety of techniques have been utilized to improve data access speed. Disk cache memory capable of holding an entire track of data has been used to eliminate seek and rotation delays for successive accesses to data on a single track. Multiple read/write heads have been used to interleave blocks of data on a set of disks or on a set of tracks on a single disk. Common data block sizes are byte size, word size, and sector size. Disk interleaving is a known supercomputer technique for increasing performance, and is discussed, for example, in the above-noted article.

Data access performance can be measured by a number of parameters, depending on the relevant application. In transaction processing (such as in banking) data transfers are typically small and request rates are high and random. In supercomputer applications, on the other hand, transfers of large data blocks are common.

Recently developed, interrelated disk memory architectures with improved performance at relatively low cost are grouped under the term "Redundant Arrays of Inexpensive Disks" (RAID). See, for example, David A. Patterson, et al., "A Case for Redundant Arrays of Inexpensive Disks (RAID)", Report No. UCB/CSD 87/89, December, 1987, Computer Science Division (EECS), University of California, Berkeley, Calif. 94720. As discussed in the Patterson et al. reference, the large personal computer market has supported the development of inexpensive disk drives having a better ratio of performance to cost than Single Large Expensive Disk (SLED) systems. The number of I/Os per second per read/write head in an inexpensive disk is within a factor of two of the large disks. Therefore, the parallel transfer from several inexpensive disks in a RAID architecture, in which a set of inexpensive disks function as a single logical disk drive, produces greater performance than a SLED at a reduced price.

Unfortunately, when data is stored on more than one disk, the mean time to failure (MTTF) varies inversely with the number of disks in the array. To correct for this decreased mean time to failure of the system, error recognition and correction is characteristic of all RAID architectures. The Patterson et al. reference discusses 5 RAID architectures each having a different means for error recognition and correction. These RAID architectures are referred to as RAID levels 1–5.

RAID level 1 utilizes complete duplication of data (sometimes called "mirroring") and so has a relatively small performance per disk ratio. RAID level 2 improves this performance as well as the capacity per disk ratio by utilizing error correction codes that enable a reduction of the number of extra disks needed to provide error correction and disk failure recovery. In RAID, level 2, data is interleaved onto a group of G data disks and error correction codes (ECC) are generated and stored onto an additional set of C disks referred to as "check disks" to detect and correct a single error. The ECC are used to detect and enable correction of random single bit errors in data and also enables recovery of data if one of the G data disks crashes. Since only G of the C+G disks carries user data, the performance per disk is proportional to G/(G+C). G/C is typically significantly greater than 1, so RAID level 2 exhibits and improvement in performance per disk over RAID level 1. One or more spare disks can be included in the system so that if one of the disk drives fails, the spare disk can be electronically switched into the RAID to replace the failed disk drive.

RAID level 3 is a variant of RAID level 2 in which the error detecting capabilities that are provided by most existing inexpensive disk drives are utilized to enable the number of check disks to be reduced to one, thereby increasing the relative performance per disk over that of RAID level 2. Typically parity data is substituted for ECC. Either ECC, some other error code, or parity data may be termed redundant data. For both RAID levels 2 and 3 the transaction time for disk accesses for large or grouped data is reduced because bandwidth into all of the data disks can be exploited.

The performance criteria for small data transfers, such as is common in transaction processing, is known to be poor for RAID levels 1–3 because data is interleaved among the disks in bit-sized or byte-sized blocks, such that even for a data access of less than one sector of data, all disks must be accessed. To improve this performance parameter, in RAID level 4, a variant of RAID level 3, data is interleaved onto the disks in sector interleave mode instead of in bit or byte interleave mode as in levels 1–3. In other words, individual I/O transfers involve only a single data disk. The benefit of this is from the potential for parallelism of the input/output operations. This reduces the amount of competition among separate data access requests to access the same data disk at the same time.

Nonetheless the performance of RAID level 4 remains limited because of access contention for the check disk during write operations. For all write operations, the check disk must be accessed in order to store updated parity data on the check disk for each stripe (i.e., row of sectors) of data into which data is written. Patterson et al. observed that in RAID level 4 and level 5, an individual write to a single sector does not involve all of the disks in a logical mass storage device since the parity bit on the check disk is just a single exclusive OR of all the corresponding data bits in a group. In RAID level 4, write operations always involve reading and rewriting the parity disk, making the parity disk the bottleneck in access to the array for low current write operations. RAID level 5, a variant of RAID level 4, mitigates the contention problem on write operations by distributing the parity check data and user data across all disks. For RAID level 4, large write operations (those extending to all of a parity stripe unit) do not require a preliminary read.

However, contention issues still arise. Both RAID level 4 and 5 have required, with each read-modify-write operation (e.g., an update of a record), 2 accesses to each of 2 disks. An update involves a read of the existing user data on a data disk and a read of parity data for the stripe to which the user data belongs on a parity disk. This is followed by writes to both disks of the updated user data and parity data respectively. The read operations are prerequisite to calculating updated parity, which is done using the following function:

new parity=(old data.XOR.new data).XOR.old parity.

To prevent loss of coherence of parity data, processing of a data update operation on RAID levels 4 and 5 mass storage systems has required atomic, or serialized, read-modify-write operations during which the drive storing parity data has been locked to prevent change of the parity information for another data update operation before the first update is complete. Coherence of parity means that parity continues to represent the equivalent of and a series of exclusive OR operations performed sequentially of the data of the parity group. Drive locking prevents command queuing in disk subsystems which support Tagged Command Queuing (TCQ).

Tagged Command Queuing is defined in the standards for the Small Computer Systems Interface (SCSI). It provides for handling multiple commands being sent to a drive by a host without waiting for responses. Commands, and responses, are tagged allowing the host to match response to request. In some systems optimization in terms of execution order of the operations may be done to improve drive performance. Linked commands are provided for to insure execution of commands in a predetermined order if required. Serializing access to the drive prevents command queuing, and subsequently the disk subsystem controller cannot optimize operation sequence and performance of the disk subsystems suffers greatly.

The term "striping" is often seen in reference to the RAID art. Striping is data interleaving over a plurality of disk drives by "strip units." A stripe unit is a group of logically contiguous data that are written physically consecutively on a single disk before placing data on a different disk. A data stripe comprises a logical collection of stripe units.

SUMMARY OF THE INVENTION

It is an object of the present invention to provide a set of mass storage devices that collectively perform as one or more logical mass storage devices.

It is another object of the invention to provide a system and method of command queuing on parity drives in RAID levels 4 and 5 systems.

These and other objects of the invention are achieved as is now described. A method of queuing commands on an input/output controller for a parity drive in a level 4 or level 5 redundant array of disk drives responds to receipt of a write instruction with appended data by determining a logical block address on a disk drive for the appended data and a logical block address on a disk drive for redundant data belonging to a destination stripe, for the appended data.

If a parity cache entry corresponds to the parity data logical block address, a cache hit has occurred. Responsive to a cache hit, computation of replacement parity data for the stripe may be done from parity data in cache at a location given by the parity cache entry, data read from the data drive and the appended data. The newly calculated parity data is then placed in cache. A command is then sent to an input/output controller for the drive where the parity data is located to write the replacement parity data. Serialization of access to the parity data is moved from the disk drive to cache memory, allowing command queuing to be used with the disk drive for the parity data to preserve high performance operation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
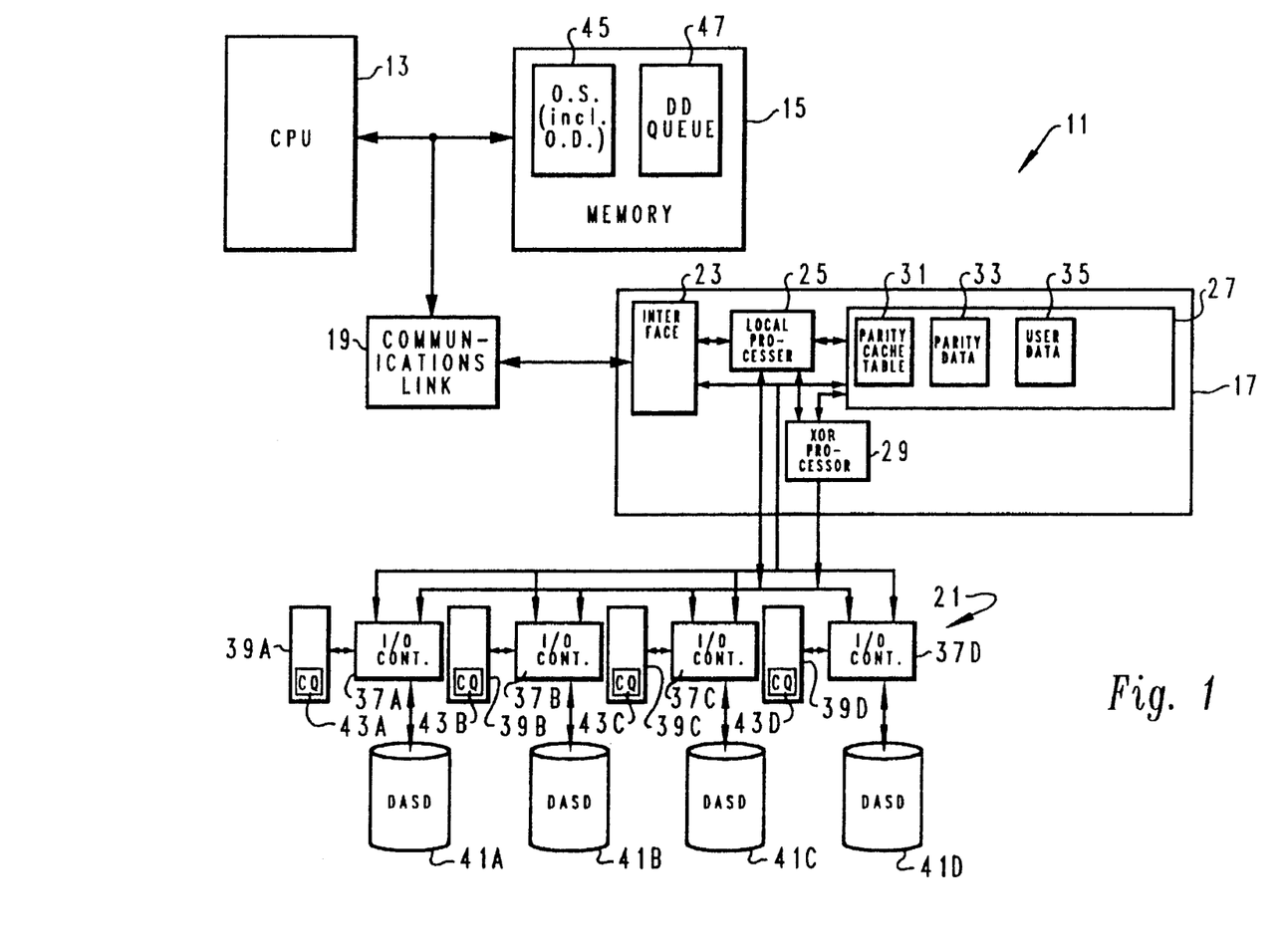
FIG. 1 is a high level block diagram of a data processing system including a redundant array of inexpensive disks.

With reference now to the figures and in particular with reference to FIG. 1, there is depicted a data processing system 11. Data processing system 11 includes a system central processing unit 13, a system memory 15, at mass storage controller 17 and a communications link 19 linking the CPU 13, memory 15 and mass storage controller 17 for interchange of data and commands. Communications link 19 may be a system bus or it may represent some type of network.

Mass storage controller 17 provides for striping data blocks to and recovering data blocks from a redundant array of inexpensive disks 21. The present invention applies to utilizations of redundant array 21 in a level 4 or level 5 mode. Mass storage controller 17 comprises an interface 23 to communications link 19. Interface 23 may be to a system bus (e.g. microchannel, EISA, etc) or to a SCSI (small computer systems interface) connection or a network adaptor into communications link 19. Connected between local processor 25 and memory buffer 27 is an exclusive OR processor 29. Exclusive OR processor 29 is utilized to generate parity data over data stripes used as redundant information within the redundant array 21 and is used to improve performance. Exclusive OR processor 29 also provides for update of parity information.

Various types of data may be stored on memory 27 including a parity cache table 31 and blocks of parity data 33. User data blocks 35 may pass through buffer 27 on a transitional basis, particularly for error recovery. Local processor 25 takes data received over interface 23 from communications link 19 and organizes the data for striping among a plurality of direct access storage devices within the redundant array of inexpensive disks 21. Local processor 25 also recovers and reorganizes data from redundant array 21 utilizing memory 27 for application back over interface 23 to computational units of data processing system 11.

Local processor 25 is also used to implement a process for serialization of access to parity data blocks 33 within memory 27. Data is passed from mass storage controller 17 to redundant array 21 through a plurality of input/output controllers 37A–37D. Each of input/output controllers 37A–37D has access to a local buffer 39A–39D, respectively, and controls a direct access storage device or disk drive 41A–41 D, respectively. Within each local buffer 39A–39D is a command queue 43A–43D, respectively. Input/output controllers 37A–37D may optimize the order of execution of commands queued in command queues 40A–40D, within certain constraints.

Memory 15, for a computer based data processing system 11, will include an operating system 45 which in turn includes a plurality of device drivers including a device driver for a logical storage device implemented by mass storage controller 17. Also maintained within memory 15 is a device driver queue of commands which have been sent by CPU 13 to mass storage controller 17 for execution.

Figure 2:
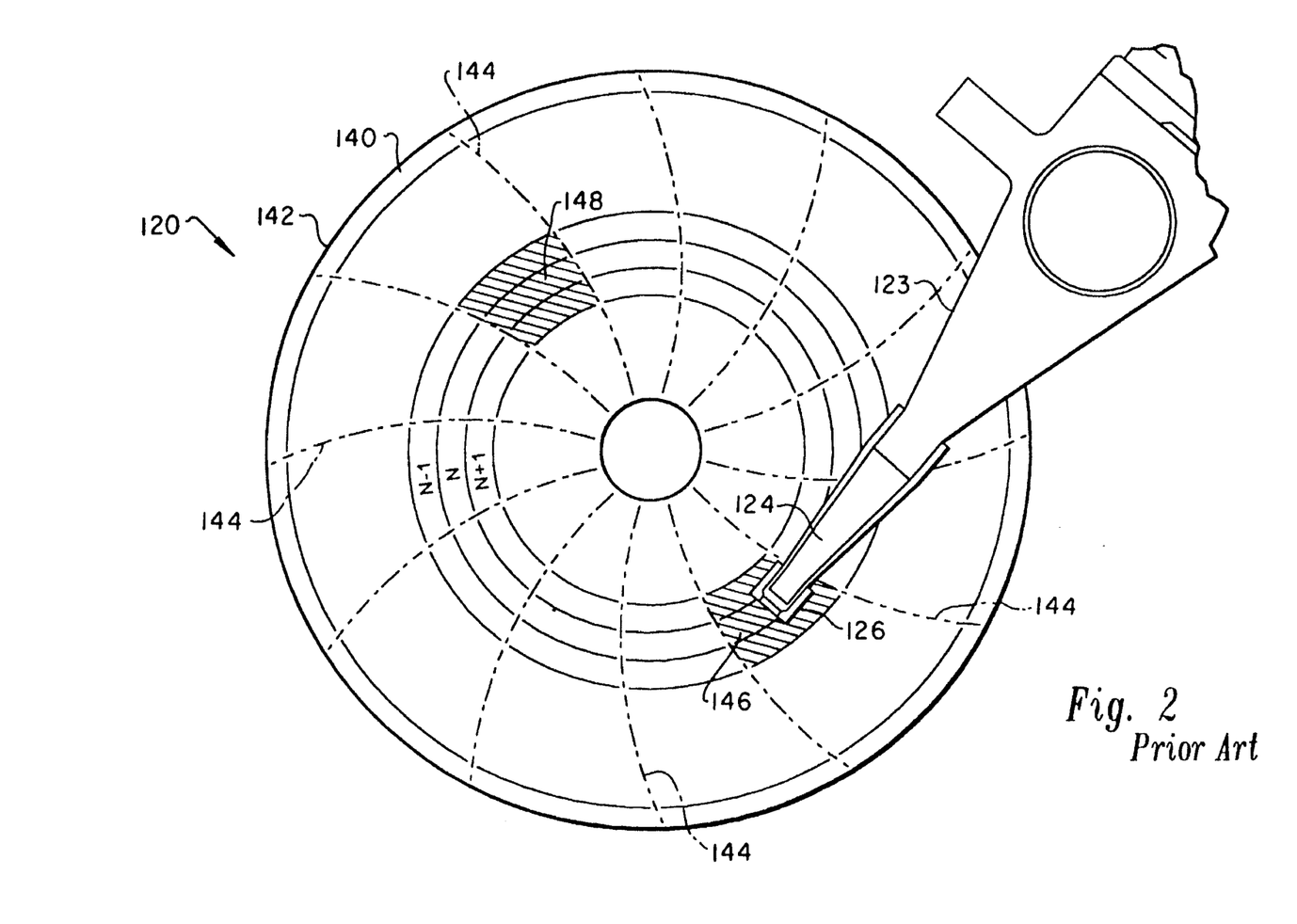
FIG. 2 is a top plan view of a disk drive.

FIG. 2 is a top plan view of a disk drive 120, and is used to illustrate certain aspects of disk drive operation useful to understanding the invention. Positioning of slider 126 by an arm 123 over one of a plurality of tracks (1 to N+ 1) on a magnetic surface of 140 of a disk 142 is done to read or to write data to sectors such as sectors 146 and 148 within the track. Each track is divided into segments or sectors by a plurality of track servo fields 144 extending radially from the center of disk 140. Track servo fields curve to conform to the travel of slider 126 at the end of rotatable arm 123. If disk rotational speed is constant (i.e. of constant angular velocity or "CAV"), a transducer mounted to slider 126 encounters a track servo field 144 at strict intervals of times. Tracking information is derived from servo fields 144 in a manner well known in the art. Slider 126 flies blind between servo fields. When user data or parity data is updated on disk 120, the old data may be read from and the replacement data is always written to a predefined location. For example, if sector 146 contains either type of data, it is read on a first rotation and the updated data is written to the sector on a second or later rotation. A delay corresponding to at least one rotation is incurred between a read and a write done to a sector. In the prior art, access to a disk where parity data is stored cannot be permitted during this period, affecting drive performance.

Figure 3:
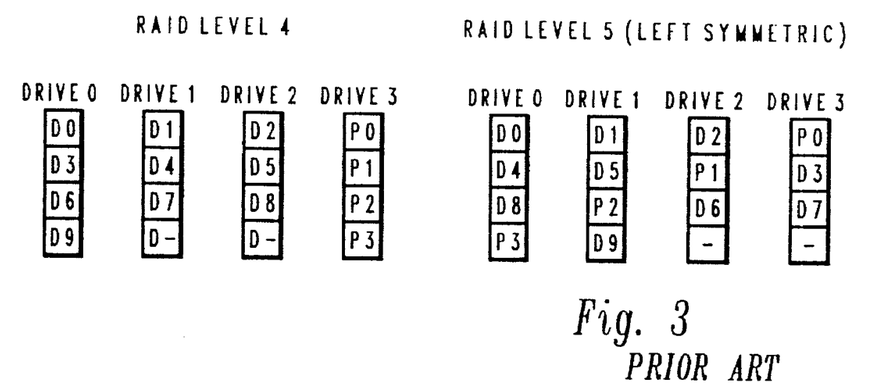
FIG. 3 is a schematic illustration of data striping in RAID levels 4 and 5 systems.

FIG. 3 depicts striping of user data and parity data blocks among a plurality of 4 disk drives. Both RAID level 4 and RAID level 5 (left symmetric) are illustrated. In RAID level 4 four stripes are shown: the first stripe including data blocks D0, D1, D2 and P0 on drives 0–3, respectively; a second stripe including data blocks 3–5 and parity block 1 on drives 0–3, respectively; a third stripe including data blocks 6–8 and parity block 2 on drives 0–3, respectively; and a fourth stripe including data block 9–11 and parity block 3 on drives 0–3, respectively. In RAID level 4 the third drive is known as the check disk.

RAID level 5 includes no check disk because any of the drives may include parity data. The RAID level 5 example has stripes with exactly the same membership as in RAID level 4. However, after the first stripe the data distribution is different. For the second stripe, the parity block goes on drive 2, for the third stripe the parity block goes on drive 1 and for the fourth stripe the parity block goes on drive 0. With the second stripe the data blocks are rotated to the left with the block on the end moving to drive 3. With the third stripe the average displacement of blocks has reached two drives to the left and with the 4th stripe 3 blocks to the left. RAID level 5 is designed to avoid contention in access to a check disk.

Figure 4:
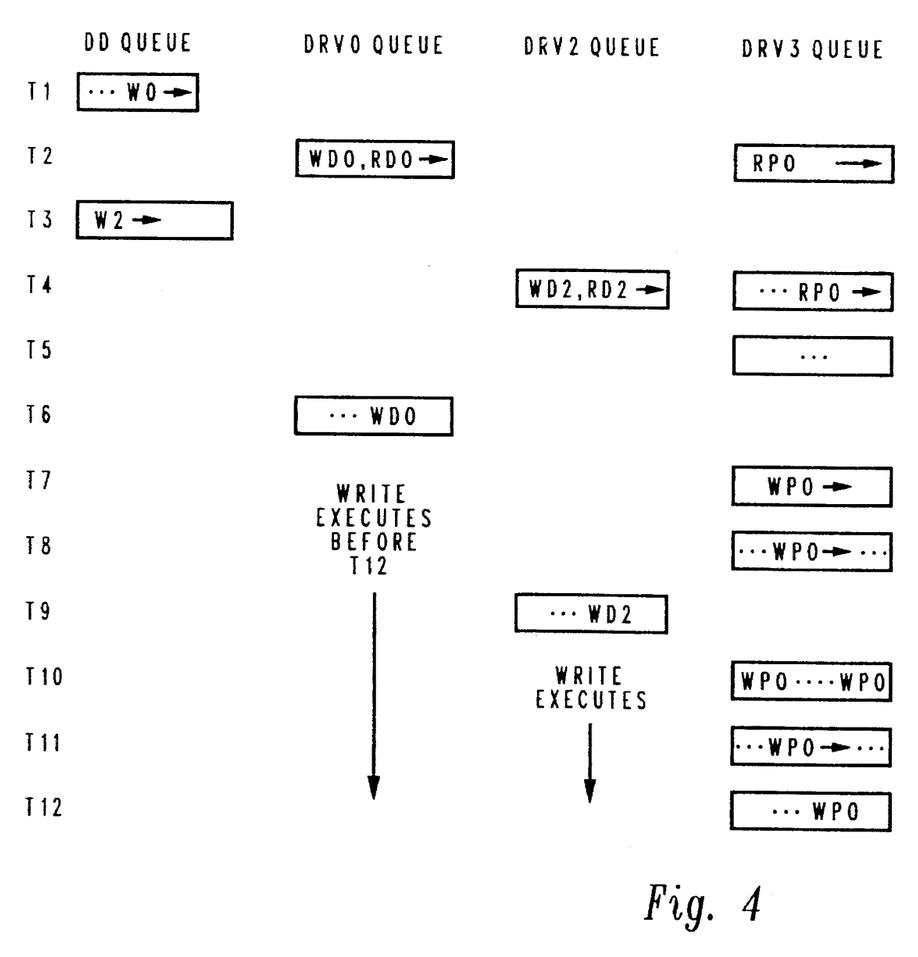
FIG. 4 is a timing diagram for a sequence of commands utilized for modifying data striped in RAID levels 4 or 5 systems.

FIG. 4 is a timing chart illustrating queuing of commands on the command queues of drives 1, 3 and 4 and on a device driver queue. The example considered in FIG. 4 is applicable to either RAID level 4 or RAID level 5 and relates to write update commands from a host to update first a block D0 on drive 0 followed by update of block D2 on drive 2. Each of these updates requires a corresponding update of parity for the same stripe which in both cases is parity block P0. Contention for access to P0 occurs. Each host request to update includes appended data constituting the update, or identifies a location in memory 15 to retrieve the data from. At time T1 a command to write data to data block 0 is in a device driver queue 47. At time T2 a linked pair of commands to read the data in block 0 and to write appended data to block 0 have appeared in the drive 0 command queue. Also occurring at time T2 an instruction to read the parity block 0 is placed in the drive 3 queue. This occurs only if no cache hit occurred indicating the data of parity block 0 was held in buffer 27.

At time T3, a command to read the data in data block D2 is placed in device driver queue 47. Later, at time T4, linked commands derived from the command to read data block D2 appear in the drive 2 command queue, including a read data block D2 and a write data block D2. Also at time T4, the instruction to read parity block P0 is shown as progressing through the drive 3 command queue. At some time after T4 but before T6 parity block P0 is read into buffer 27. Also prior to time T6, the instruction to read data block DO has been executed. At time T6 the command to write the updated data to data block DO is shown reaching the output end of the command queue for drive 0. This command will be performed at some time before time T12. At time T7 a write instruction is placed in the drive 3 command queue to replace the data of parity block P0. Progress of this command continues through time period T8. At time period T9 the read instruction for user data block D2 has been executed from the drive 2 command queue and the instruction to write updated data to the data block D2 has reached the output end of the command queue. Execution will occur at some time after T9. At time T10 a write instruction to parity block P0 is placed in the entry end of drive 3 command queue. At this point in time T10, two write instructions to parity block P0 exist simultaneously in drive 3 command queue. Time periods T11 and T12 show the progress of the second write instruction to the parity block P0 within the drive 3 command queue.

Figure 5:
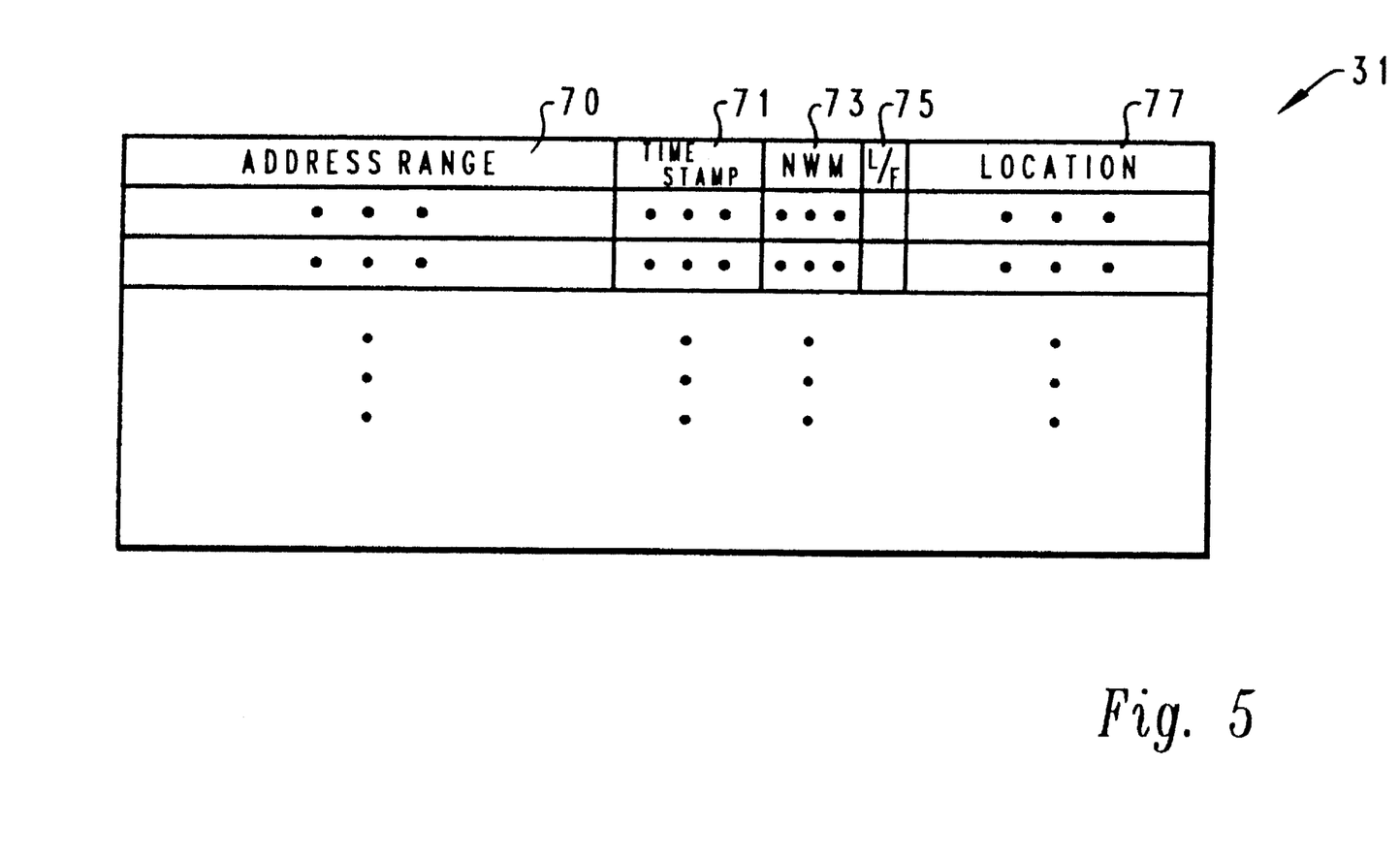
FIG. 5 is a data structure for a parity cache table used to support the invention.

FIG. 5 illustrates the structure of parity cache table 31. Parity cache table comprises a maximum of K entries associated with blocks of parity data which are resident in buffer 27. In alternative embodiments, parity cache table 31 and the parity data blocks 33 may be stored in system memory 15. Those skilled in the art will recognize that access to data in buffer 27 would be preferable as being quicker than access to memory 15, although either of these is faster than recovery from a disk drive. Use of memory 15 to store the data structures also leads to increased traffic on communications link 19.

Each entry in parity cache table 31 consists of a logical block address range corresponding to a logical block address range on drive unit 41D for a level 4 RAID system or on one of drives 41A–41D for a RAID level 5 system. Address range field 70 will include the beginning logical block address and end of a parity block on a drive unit. Also included in an entry is a time stamp 71 of the most recent use or access to the parity data associated with the entry. NWW field 73 is a counter of the number of writes waiting to be completed. Field 75 is a flag for providing locking of access to the data, thereby providing for serialization of modifications of the parity data in buffer 27. Finally, an entry in data cache table 31 indicates a location in the buffer to find the parity data block. Data cache table 31 and parity data blocks 33 may be maintained in nonvolatile memory to protect against loss of power.

Figure 6:
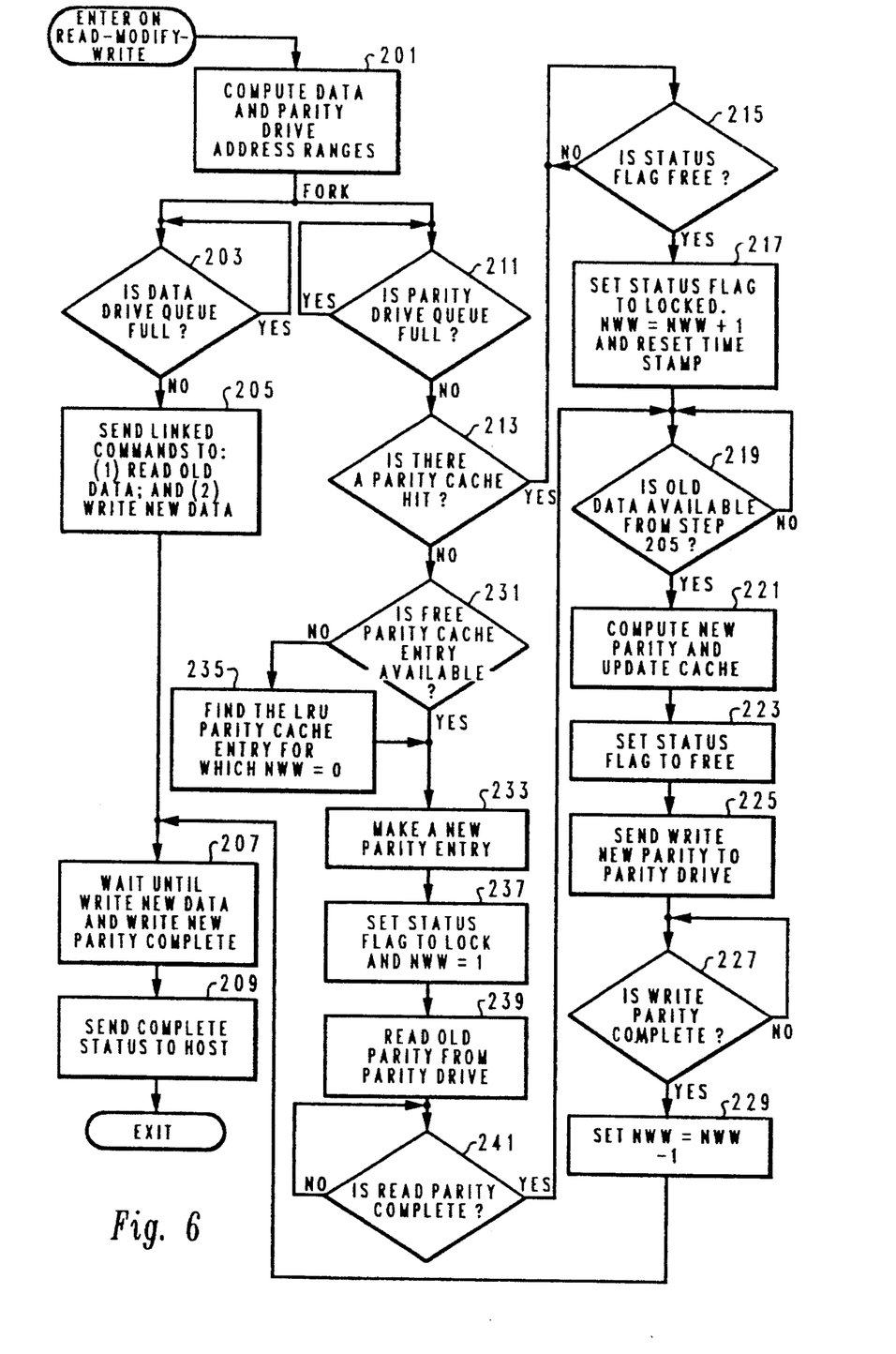
FIG. 6 is a high level logical flow chart of a process performed on a storage controller for a RAID system for implementing the invention.

FIG. 6 is a logical flowchart of a process entered upon receipt from a host processing unit of an update command requiring a read a modify and a write of data to a redundant array of inexpensive disks 21. Upon receipt of an update command including identification of appended data, logical block address ranges for the data and the parity data of the appropriate stripe are calculated at step 201. The program forks for handling the update of the user data and the update of the parity data, which are substantially unsynchronized processes allowing the drives to operate in a nonsynchronous fashion. Following the user data fork to step 203 it is determined there if the appropriate data drive command queue is full. If YES, the process waits until an entry opens in the queue. Once space is available in the command queue for the user data drive, the NO branch is followed from step 203 to step 205. In step 205, linked commands are sent to the data drive command queue to: (1) read old data from the logical block address determined in step 201 and (2) write the appended data to the same location. The process then advances to step 207 which is a wait operation which is not exited until it is indicated that both the appended data and the replacement parity data have been written. Step 207 provides in essence for the resynchronization of the two processes. After step 207, step 209 may be executed to send a complete status to the host. The process is then exited.

Along the fork for handling parity data, step 211 is executed to determine if the parity drive queue is full. If it is, a wait is executed until space becomes available in the command queue for commands to the drive holding the parity data. Once space is available, the NO branch is followed to step 213. At step 213 it is determined if an entry exists in the parity cache table for the logical block address range calculated for the parity data in step 201. If there is a parity cache hit the YES branch is taken from step 213 to step 215. At step 215 it is determined if the status of the parity data block is free. If it is not, a wait is executed until the status flag becomes free. Then the YES branch is followed from step 215 to step 217 to set the status flag to lock, to increment the number of writes waiting and to replace the time stamp in the parity cache entry. Following step 217, step 219 is executed to determine if old data is available from step 205 as required to calculate the new or replacement parity. The process waits at step 219 until the old user data becomes available. Once the data is available the YES branch is taken to step 221 to compute the new parity data and to update the parity block in cache. At step 223 the status flag is set to free and at step 225 a command to write the new parity data is sent to the appropriate disk drive for queuing in the command queue for that input/output controller. Step 227 provides a wait cycle until the input/output controller indicates that the operation of writing the parity is complete. Once this occurs, step 229 is executed to decrement the number of writes waiting by 1. Processing then continues with step 207.

If at step 213 it is determined that no parity cache hit had occurred, the NO branch is taken to step 231. At step 231 it is determined if a free parity cache entry is available. If YES, the free parity cache entry is taken to make a new parity cache entry at step 233. If NO, step 235 is executed to free a parity cache entry from the table. This is done by finding the least recently used parity cache entry for which the number of writes waiting is equal to 0. After an entry has been located a new parity entry may be made from the freed entry at step 233. Next, step 237 is executed to set the status flag to lock and number of writes waiting equal to 1. Next, step 239 is executed to read old parity from the parity drive. This will be understood to include the usual queuing of the command and a wait, as indicated by step 241 for the read operation to complete. After the read of parity is completed and the storage location in buffer 27 for the just read parity is included in the cache entry, the YES branch from step 241 is taken to step 219 were processing continues as before.

The performance improvement due to tag command queuing at the input/output controller level is not lost when such systems are applied to a RAID, level 4 or level 5 mass storage system utilizing the present invention. The data structure of the cache entry table may be implemented using nonvolatile RAM to offer protection against loss due to power failure.

While the invention has been particularly shown and described with reference to a preferred embodiment, it will be understood by those skilled in the art that various changes in form and detail may be made therein without departing from the spirit and scope of the invention.

What is claimed is:

1. A redundant array of disk drives, comprising:

means responsive to receipt of a write instruction from a host data processing system with appended data for finding a logical block address for the appended data on a data drive and a logical block address on a parity drive for redundant data;

a buffer for storing a parity cache table having a plurality of parity cache entries and for storing parity data corresponding to the parity cache entries and to logical block addresses on the parity drive;

means for determining if a parity cache entry corresponds to the logical block address of the parity drive found by the means for finding;

means responsive to an affirmative determination of correspondence for computing replacement parity data from parity data at a buffer location given by the parity cache entry, data read from the logical block address of the data drive and the appended data;

means for placing the replacement parity data at the buffer location; and means for sending a command to an input/output controller for the logical block address of the parity drive to write the replacement parity data.

2. A redundant array of disk drives as set forth in claim 1, and further comprising:

means responsive to a negative determination of correspondence for sending a command to the input/output controller for the logical block address of the parity drive to read the parity data into the buffer location; and means for generating a parity cache entry for the parity data read from the logical block address of the parity drive.

3. A redundant array of disk drives as set forth in claim 2, wherein the parity cache entry includes the logical block address of the parity data, a time stamp, locked/not locked flag, a number of writes waiting counter, a drive identification and a location field for parity data in the memory buffer.

4. A redundant array of disk drives as set forth in claim 3, and further comprising:

means responsive to determination of the logical block address of the data drive for sending linked commands to an input/output controller for the logical block address of the data drive to read data and to then write the appended data.

5. A redundant array of disk drives as set forth in claim 3, wherein the means for generating a parity cache entry further comprises:

means for determining if a parity cache table has an unused parity cache entry;

means responsive to an affirmative determination for utilizing the unused parity cache entry; and     means responsive to a negative determination for locating a parity cache entry having no writes waiting and which is least recently used, and utilizing the located parity cache entry.

6. A redundant array of disk drives as set forth in claim 3, wherein the means for sending a command to write replacement parity data further includes means for incrementing the number of writes waiting counter.

7. A redundant array of disk drives as set forth in claim 6, and further comprising:

means for serializing access to the parity data in the buffer location for generation of replacement parity data.

8. A redundant array of disk drives as set forth in claim 7, and further comprising:

means for decrementing the number of writes waiting counter in the parity cache for the logical block address of the parity drive after the replacement parity data is written to the logical block address of the parity drive.

9. A redundant array of disk drives as set forth in claim 8, wherein the parity drive is a check disk.

10. A redundant array of disk drives as set forth in claim 8, wherein the parity drive may be any one of the redundant array of disk drives.

* * * * *